US007703071B2

(12) United States Patent
Kuester et al.

(10) Patent No.: US 7,703,071 B2
(45) Date of Patent: Apr. 20, 2010

(54) METHOD FOR MODELING BUSINESS TRANSFORMATION

(75) Inventors: Jochen M Kuester, Zurich (CH); Jana Koehler, Oberrieden (CH); Ksenia Ryndina, Zurich (CH); Rainer F Hauser, Thalwil (CH); Jussi Vanhatalo, Zurich (CH); Michael Wahler, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 11/403,663

(22) Filed: Apr. 13, 2006

(65) Prior Publication Data

US 2007/0245297 A1  Oct. 18, 2007

(51) Int. Cl.
  G06F 9/44  (2006.01)
(52) U.S. Cl. ............ 717/104; 717/101; 717/102; 717/103; 717/105; 717/106; 717/107; 717/108
(58) Field of Classification Search ............... 717/100, 717/101, 102, 103, 104, 107, 108, 110, 112; 707/201; 709/223
See application file for complete search history.

(56) References Cited

U.S. PATENT DOCUMENTS

| 5,918,232 | A  | * | 6/1999  | Pouschine et al. | 707/103 R |
|-----------|----|---|---------|------------------|-----------|
| 5,946,694 | A  | * | 8/1999  | Copeland et al.  | 707/103 R |
| 6,023,578 | A  | * | 2/2000  | Birsan et al.    | 717/105   |
| 6,212,530 | B1 | * | 4/2001  | Kadlec           | 707/201   |
| 6,292,830 | B1 | * | 9/2001  | Taylor et al.    | 709/224   |
| 6,339,838 | B1 | * | 1/2002  | Weinman, Jr.     | 717/104   |
| 6,954,758 | B1 | * | 10/2005 | O'Flaherty       | 707/102   |
| 7,085,756 | B2 | * | 8/2006  | Carey et al.     | 707/3     |
| 7,120,643 | B2 | * | 10/2006 | Dill             | 707/102   |
| 7,503,032 | B2 | * | 3/2009  | Bhaskaran et al. | 717/104   |
| 7,506,302 | B2 | * | 3/2009  | Bahrami          | 717/100   |
| 2004/0225660 | A1 | * | 11/2004 | Carey et al.    | 707/10    |
| 2005/0044197 | A1 | * | 2/2005  | Lai             | 709/223   |
| 2008/0077549 | A1 | * | 3/2008  | Glania et al.   | 707/1     |

OTHER PUBLICATIONS

Title: Service-oriented architecture and business process choreography in an order management scenario: rationale, concepts, lessons learned, author:Olaf Zimmermann et al, source: ACM, dated: Oct. 2005.*
Title: Visual modeling of business problems: workflow and patterns, author: Lev Virine et al, source: ACM, dated: Dec. 2004.*
Zimmermann O., Krogdahl P., Gee C (2004). *Elements of Service-Oriented Analysis and Design. IBM developerWorks.*

(Continued)

*Primary Examiner*—Chameli C Das
(74) *Attorney, Agent, or Firm*—Michael J. Buchenhorner; Stephen C. Kaufman

(57) ABSTRACT

A method for modeling business transformation includes steps of: constructing a first analysis model based on at least one legacy-business-process-model; and analyzing the first analysis model in conjunction with at least one business-process-reference-model. The method further includes deriving a second analysis model in response to analyzing the first analysis model in conjunction with the at least one business-process-reference-model and refining the second analysis model to obtain a design model.

1 Claim, 9 Drawing Sheets

OTHER PUBLICATIONS

Deborin E. et al (2002). *Continuous Business Process Management with HOLOSOFX BPM Suite and IBM MQSeries Workflow. IBM Redbooks.*

Endrei M. et al (2004). *Patterns: Service-Oriented Architecture and Web Services. IBM Redbooks.*

J. Koehler et al (2005). *Declarative Techniques for Model-Driven Business Process Integration. IBM Systems Journal 44*(1), 2005, pp. 47-65.

Zimmerman O., Krogdahl P., Gee C (2004), "Elements of Service-Oriented Analysis and Design," IBM developerWorks.

Deborin E. et al., (2002). Continuous Business Process Management with HOLOSOFX BPM Suite and IBM MQSeries Workflow, IBM Redbooks, 2002.

Endrei M. et al., (2004). "Patterns: Service-Oriented Architecture and Web Services," IBM Redbooks.

Arthur Ter Hofstede and Wil Van Der Aalst, "Workflow Patterns," 2007-2009 Workflow Patterns Initiative.

J. Koehler et al. (2005), "Declarative Techniques for Model-Driven Business Process Integration," IBM Systems Journal 44(1), 2005, pp. 47-65.

Arthur ter Hofstede and Wil van der Aalst, "Workflow Patterns," 2007-2009 Workflow Patterns Initiative.

\* cited by examiner

METHOD FOR MODELING BUSINESS TRANSFORMATION

FIELD OF THE INVENTION

The present invention relates generally to modeling a business transformation and more specifically, to analyzing business operations and generating an IT solution from a legacy business model.

BACKGROUND OF THE INVENTION

Business transformation deals with the strategic alignment of business and IT to deliver enduring on-demand value of continual business innovation and improvement. The latest industry trends suggest that business transformations can be best achieved by adopting a Service-Oriented Architecture (SOA). A SOA is a set of business-aligned IT services that support an organization's business goals and objectives by using interface-based service descriptions that decouple the provider and consumer of the service through open standards and protocols.

Adopting a SOA is a non-trivial task that includes many challenges. Some of the challenges are analyzing and modeling of business strategy and operations to drive business transformation, efficient generation of an IT solution from a business model using techniques from Model-Driven Development (MDD) of software systems, and monitoring and dynamic management of business performance for continual improvement.

Service-Oriented Analysis and Design (SOAD) is characterized as a holistic modeling and implementation discipline, which comprises an entire spectrum of modeling tasks that aim at systematically constructing SOA implementations. Some of the main requirements that characterize SOAD are that SOAD must facilitate end-to-end modeling, SOAD must be process-driven, for example it is centered around business process modeling with the goal to identify generic business services that are closely mapped to the business process model and SOAD must provide well-defined quality factors and best practices. Some elements of SOAD have already been developed, for example Business Process Modeling methodologies (BPM).

BPM approaches provide a business-oriented view on functional units of work, but they typically do not reach into the architecture and implementation domain. Modeling and development initiatives are separated from each other in BPM approaches. BPM can be considered as an emerging, but fragmented discipline with many different styles, notations and assets. BPM focuses mainly on creating AS-IS and TO-BE business process models from scratch without reusing existing model-based assets, such as existing or legacy business models and reference models. An AS-IS business model is a model that portrays how a business process is currently structured. In process improvement efforts, it is used to establish a baseline for measuring subsequent business improvement actions and progress. Whereas, a TO-BE business model is a process model that results from a business process redesign or reengineering action. The TO-BE business model shows how the business process will function after the improvement action is implemented.

Elements of a business-driven modeling process and an IT-driven design and implementation process exist today. Some elements of a top-down approach exist in BPM, but it stops when the TO-BE business process model has been derived. In particular, no use of business process reference models for the derivation of the TO-BE business process model has been established. The IT-driven design and implementation process also has top-down elements, but it does not link to the BPM space. Bottom-up elements, which ensure that existing legacy software is reflected correctly in a SOA project, are almost completely missing. The result of these gaps is a disconnection of business goals from the implementation.

Thus, there is a need for designing a process for SOAD, whereby the existing model-based assets are preserved, the business processes are improved and aligned with industry best practice process models and a top-down process is organized when reference models are to be applied in order to improve existing business processes.

SUMMARY OF THE INVENTION

An aspect of the invention is to provide a method and a system for providing a business process transformation service to an enterprise.

In order to fulfill above aspect, the method comprises determining a plurality of modeling objectives and identifying a plurality of process boundaries based on information from the enterprise. Thereafter, a first analysis model is constructed based on at least one legacy-business-process-model. The first analysis model is then analyzed in conjunction with at least one business-process-reference-model. The method further comprises deriving a second analysis model and refining the second analysis model to obtain a design model.

BRIEF DESCRIPTION OF THE DRAWINGS

The foregoing objects and advantages of the present invention for a method of facilitating modeling for business transformation may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION

Figure 1:
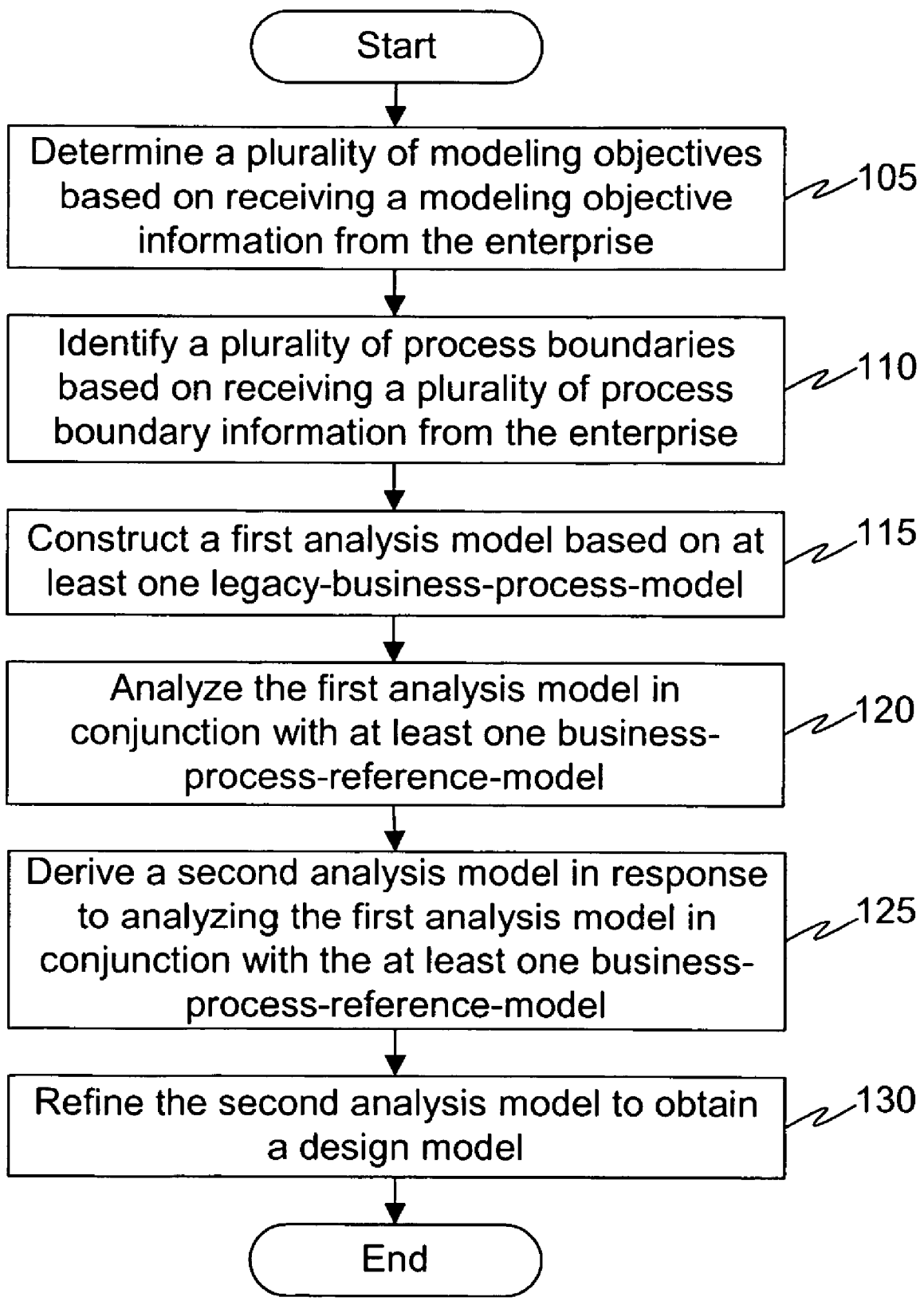
FIG. 1 illustrates a flow diagram of a method for modeling business transformation in accordance with an embodiment of the present invention.

Before describing in detail embodiments that are in accordance with the present invention, it should be observed that the embodiments reside primarily in combinations of method steps and apparatus components related to a method and apparatus for modeling for business transformation. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for facilitating modeling for business transformation. The non-processor circuits may include, but are not limited to, a radio receiver, a radio transmitter, signal drivers, clock circuits, power source circuits, and user input devices. As such, these functions may be interpreted as steps of a method for facilitating modeling for business transformation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the present invention deals with analyzing business operations of an enterprise, creating a business model based on the analysis and efficiently generating IT solution from the business model. The present invention, essentially, refines and extends a conventional Business Process Modeling methodology (BPM) to obtain an enhanced BPM by adopting best practices in the industry and by reusing and restructuring existing legacy models and reference models. Moreover, the present invention provides novel tooling that enables speeding-up of the enhanced BPM and also partially automates the enhanced BPM. In the enhanced BPM, business process modeling is performed such that it reaches into the architecture and implementation domain of existing legacy systems to meet the needs of a Model-Driven Development (MDD) process.

Typically, an enterprise or a customer, for which an enhanced business process model is desired to be constructed, can have its own existing legacy-business-process-models. A legacy-business-process-model is a business model that is defined as a legacy model for an enterprise or a customer. Generally, a legacy model for an enterprise or a customer is an existing business process model for the enterprise or the customer. The legacy-business-process-models can be represented in an Event-Driven Process Chains notation (EPC). An EPC provides comprehensive means for modeling several aspects of a business process. The main elements of EPC are functions and events. Functions are triggered by events and functions produce events. The control flow of the business process can be described by a sequence of alternating events and functions. Alternative or parallel paths can be modeled with logical operators, such as AND (where all paths are in parallel and simultaneous function processing is possible), XOR (where only one alternative path exists), OR (where one or several paths exists) and SEQ (where all paths are in arbitrary order, but no functions are processed simultaneously) or more complex expressions. These operators can be used for splitting and joining the control flow.

Referring now to FIG. 1, a flow diagram of a method for modeling business transformation is illustrated in accordance with an embodiment of the present invention. Conventional methods do not use legacy-business-process-models while constructing business process models. However, using the legacy-business-process-model belonging to an enterprise or a customer ensures that the existing requirements and constraints are incorporated early into the business process model. Those skilled in the art will realize that the models produced by the method of the present invention can be used in a model-driven software development process aiming at adopting a Service-Oriented Architecture (SOA). The business process models formed using the method of the present invention can deliver the processes and the services of this SOA and can contain information for deriving a SOA based IT solution. At step 105, a plurality of modeling objectives are determined based on receiving a modeling objective information from an enterprise. The requirements and the goals of the business process are determined. These goals and modeling objectives are different from the conventional BPM in the sense that the primary goal is to directly derive the SOA. However, business goals and modeling objectives derived from the economic consideration can be identified as usual. The goals and modeling objectives can be refined into specific Key Performance Indicators that are measurable on the business process models and their derived implementation.

At step 110, a plurality of process boundaries are identified based on receiving a plurality of process boundary information from the enterprise. The relevant legacy-business-process-models are determined at this step. For example, the legacy-business-process-models that exist already and capture information that is relevant for the business process of the enterprise.

At step 115, a first analysis model is constructed based on at least one legacy-business-process-model. Those skilled in the art shall realize that more than one legacy-business-process-model can also be used and is within the scope of the invention.

The first analysis model is an AS-IS analysis model, which can be defined as a business process model that represents an initial partitioning of a legacy-business-process-model into sub-processes and tasks and that shows the main control flow between them. In an embodiment of the present invention, the legacy-business-process-model can be in an Event-driven Process Chains (EPC) notation and the first analysis model can be in an IBM WebSphere Business (WB) notation. The first analysis model can be modeled in the WB notation using a WebSphere Business (WB) Modeler. A notation employed by the WB Modeler is known as the WB notation. The WB Modeler is a visual process editor that helps build a choreographed business process in five simple steps, for instance, creating services, creating process, choreographing process, deploying process and testing and debugging process. The WB Modeler allows visual debugging of local or remote process instances. A plurality of process variables can be viewed or changed, breakpoints can be set before or after execution of an activity, and a JAVA code can be debugged. An EPC business process model is structured differently to a WB model; an EPC model is not as strictly hierarchical as a WB model. The specifics of EPC notations are known in the art. Such a model can be analyzed and discussed with the customer and does not include implementation-specific details.

At step 120, the first analysis model is analyzed in conjunction with at least one business-process-reference-model. A business-process-reference-model is a business process model that has been defined as a reference model. Generally, a reference model integrates well-known concepts of business process reengineering, benchmarking, and process measurement into a cross-functional framework. In an embodiment of the present invention, the business-process-reference-models can be a property of the service provider who is responsible for constructing the business process model. The analysis may comprise determining differences between the business process, as captured in the first analysis model, and best-practice reference models. Further, a mapping between the first analysis model (for example the AS-IS analysis model) and a plurality of business-process-reference-models can be constructed. The business-process-reference-models help focusing on future business needs and architecture alternatives. Moreover, the business-process-reference-models facilitate a strengths, weaknesses, opportunities, and threats (SWOT) analysis and it helps in identifying problem areas in the business process that is desired to be modeled. The business-process-reference-models also help in identifying necessary changes in the business process and simulating ideas for new process designs by the virtue of step 120, where the first analysis model is analyzed in conjunction with at least one business-process-reference-model.

The business-process-reference-models also lead to constructing final business models of higher quality. A plurality of tasks and sub-processes in the business-process-reference-models relate to services provided in associated implementation and component models. For example, the business-process-reference-models serve not only as a guideline at the analysis level, but they also reach into the architectural and implementation level and combine business and IT-oriented modeling elements. Therefore, the gap between the enterprise and solution architecture is reduced as the business-process-reference-models already bridge this gap. In an exemplary embodiment of the present invention, the business-process-reference-models use many different model types, for example flow diagrams, organization diagrams, tabular descriptions, text, expressions and rules.

At step 125, a second analysis model is derived in response to step 120. The second analysis model is a TO-BE analysis model. The mapping that is constructed between the first analysis model and the business-process-reference-models helps in setting a direction for how the business-process-reference-models will be adjusted to arrive at the TO-BE analysis model. Therefore, the mapping between the first analysis model and the business-process-reference-models serves as the starting point for deriving the second analysis model (for example the TO-BE analysis model).

At step 130, the second analysis model is refined to obtain a design model. The design model describes how a business process is realized using hardware, software and people. In an embodiment of the present invention, the design model can be obtained from the second analysis model by adding further details to the second analysis model, applying a plurality of model transformations to the second analysis model and making structural changes to it. Those skilled in the art shall realize that the model transformations can be applied to the second analysis model in the form of model transformation plug-ins. The transformations reflect existing application systems, meet restrictions of the target IT programming model, and lead to an IT-based flow of data and control. Specifically, a design model is ready to be mapped to a programming model, for example Web Service Definition Language (WSDL), Business Process Execution Language (BPEL), by automatic model transformations that can provide code generation for a target programming model. The TO-BE analysis model is transformed to a TO-BE design model at step 130.

Figure 2:
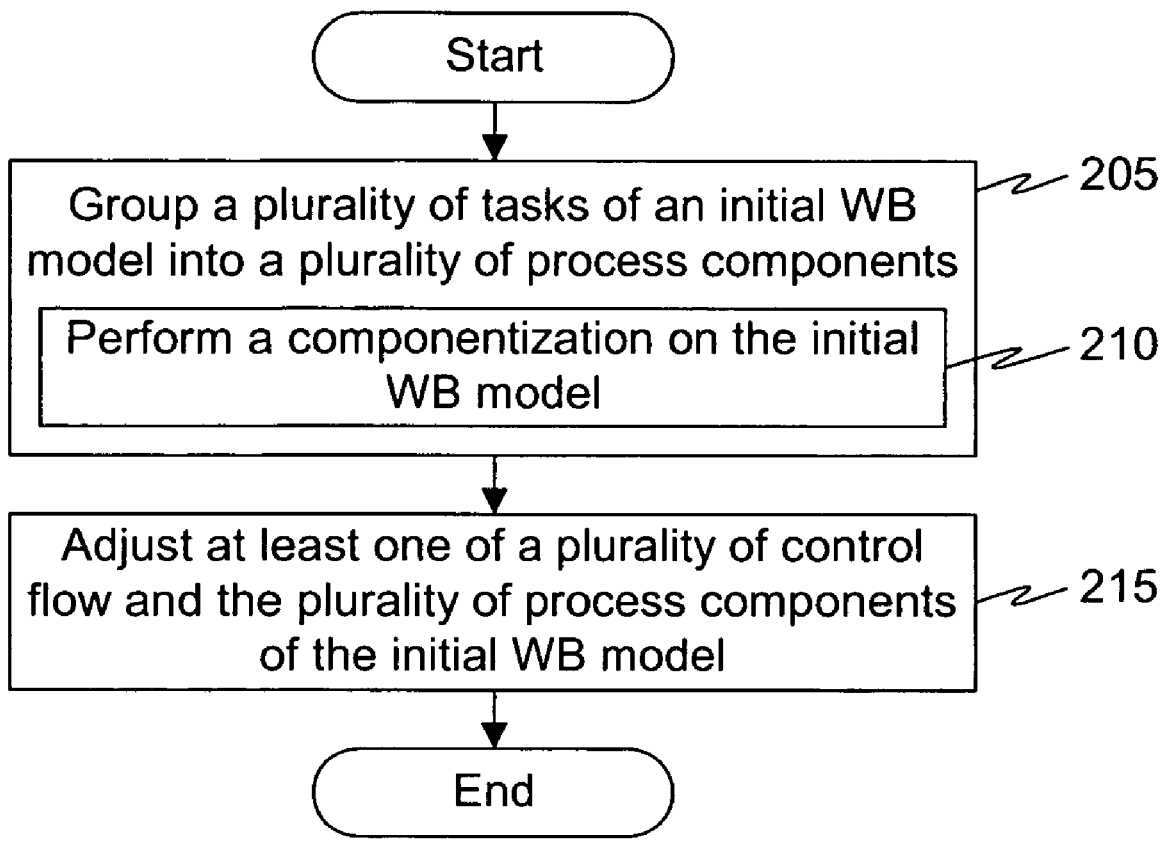
FIG. 2 illustrates a flow diagram of a method for constructing a first analysis model in accordance with an embodiment of the present invention.

Referring now to FIG. 2, a flow diagram of a method for constructing a first analysis model is shown in accordance with an embodiment of the present invention. The first analysis model is build based on a legacy-business-process-model. The legacy-business-process-model can be in EPC notation. EPC notations comprise two main types of modeling elements, functions and events. A function describes the "what" factor and it creates or modifies objects. On the other hand, events are both the cause and the result of functions. An event can be defined as the occurrence of an object or the change in a given instance of an attribute. EPC notations do not allow the user to make decision conditions explicit in the diagram. Thus, functions are not only used to describe activities in the process, but they are also used to describe parts of decision conditions. In this embodiment of the present invention, events are used to describe outcomes of decisions. Events can also describe changes of object states. EPC notations are fundamentally different in semantics from a WB notation.

The present invention employs methods that transform an EPC notation into a WB notation to enable different abstraction layers.

In an embodiment of the present invention, an initial WB model is constructed from the legacy-business-process-model, which is in EPC notation. For example, each EPC is mapped to a global process. The contents of an EPC can be mapped by mapping each function to a global task. The global task can then be used in the global process, which can technically give rise to calls to that global task, and will be appreciated by those skilled in the art. Each event can be mapped to a comment, attached to nodes in the WB notation that are derived from the EPC elements preceding the event.

Further, connectors, such as XOR, OR and AND, in the EPC legacy-business-process-model can be mapped to control action nodes in the initial WB model. Decision conditions of decision control actions are set on the basis of available information of the EPC function preceding the connector and events following the connector. Some of the examples of control action nodes are Decision (exclusive) node corresponding to XOR connectors with one incoming edge and several outgoing edges, MultiDecision (inclusive) node corresponding to OR connectors with one incoming edge and several outgoing edges, Merge node corresponding to OR connectors with several incoming edges and one outgoing edge, Fork node corresponding to AND connectors with one incoming edge and several outgoing edges and Join node corresponding to AND connectors with several incoming edges and one outgoing edge. Connectors with one incoming edge and one outgoing edge may not need to be mapped.

Edges going into functions in the legacy-business-process-model can be mapped to control flow edges in the initial WB model. In an embodiment of the present invention, edges going into events do not map to the initial WB model, because events are only mapped to comments. Also, those skilled in the art shall realize that each control action node or task that does not have a predecessor becomes the successor of a newly created start node. Similarly, each control action node or task that does not have a successor becomes the predecessor of a newly created stop node. Moreover, a function call with one incoming edge in the EPC model referring to another EPC model is mapped to a call to the global process created in the initial WB model to capture this other EPC model.

Additionally, roles and business items can be extracted from the EPC model and modeled in the WB notation. Roles can be directly identified from the roles in the EPC model. Business items are typically extracted from EPC events. This step is done manually, because the text used to describe events and functions in the EPC may need to be analyzed.

In an embodiment of the present invention, process cycles in the initial WB model are made explicit to increase the readability. The EPC function calls are translated to global process calls in the initial WB model. The translation can be distinguished into two cases. The first case occurs when one process contains a call to an arbitrary other process, for example A calls B. In this case, the initial WB model can be left unchanged. For example, there can be indirect recursions where B would contain a call to A again. This case is not dealt with and the recursion remains implicit in such cases. The second case is a recursive call, where a process contains a call to itself. Such a cycle can be made explicit by, say, introducing a merge node at the beginning of the process, removing the process call and directly connecting its incoming edge to the merge node.

Referring back to FIG. 2, the method comprises grouping a plurality of tasks of the initial WB model into a plurality of process components at step 205. Further, there can be groups of tasks or processes that reoccur in different area of the initial WB model. Tasks or processes that reoccur in different areas of the initial WB model can be replaced by a single occurrence of this task and a corresponding adjustment of the control flow. Those skilled in the art will realize that in order to achieve the same overall workflow, additional control flow nodes, such as decision nodes and merge nodes, can be introduced and the control flow can be adapted. Moreover, conditions may need to be set in the decisions such that only execution sequences possible for the initial WB model before adaptation are possible afterwards. In some cases, the control flow adaptation may lead to cycles in the initial WB model, and will be appreciated by those skilled in the art.

The grouping step, step 205, comprises performing a componentization on the initial WB model at step 210. The initial WB model is given a hierarchical structure by identifying a plurality of process components. Each process component groups several tasks that are logically related, for example contribute to achieving a specific business goal in the process. The process components are formed such that they form a suitable semantic unit based on a plurality of modeling objectives and process boundaries. In an embodiment of the present invention, an algorithm that can be used for componentization is described in conjunction with FIG. 3.

Upon grouping the plurality of tasks of the initial WB model into the plurality of process components at step 205, at least one of a plurality of control flow and the plurality of process components of the initial WB model is adjusted at step 215. The adjustment can be done manually. A first analysis model is obtained upon adjusting the initial WB model at step 215. The control flow in the initial WB model that resulted from the grouping step can be revisited with the enterprise or the customer for confirmation and adjustment.

Since the EPC approach does not differentiate between connectors to open and close a branching control flow in a model, for instance, the same AND connector is used to open and close a parallel flow and the same OR connector is used to open and close an alternative sequential flow, it can happen that semantic errors in the EPC become apparent in the initial WB model, because the initial WB model will map an opening AND connector to a Fork, a closing AND connector to a Join, an opening OR connector to a Decision, and a closing OR connector to a Merge. In particular, an AND connector in the EPC model may lead to semantic problems if a Fork node does not have a corresponding Join node in the initial WB model. The EPC XOR or OR connectors, which are mapped to a Decision node, typically do not induce semantic problems. In order to find semantic problems due to Fork nodes, the initial WB model is examined for Fork nodes without corresponding Join nodes.

In case of such semantic problems, the enterprise or the customer can be asked whether or not it is necessary to have a Fork node and thus create several threads of control flow without joining these control flows within a current component. Determination of the current component is explained in detail in FIG. 3. It can also be inquired whether it is necessary to have more than one starting node for the current component.

In an embodiment of the present invention, while building the first analysis model, the modeling methodology can further be refined. This can be done by making the stakeholders more conscious of the methodology and modeling process. For example, this may comprise establishing a naming convention for business processes, tasks and sub-processes and defining the levels of hierarchical abstraction which can comprise the number of layers of sub-processes and the degree of reuse of sub-processes.

Figure 3:
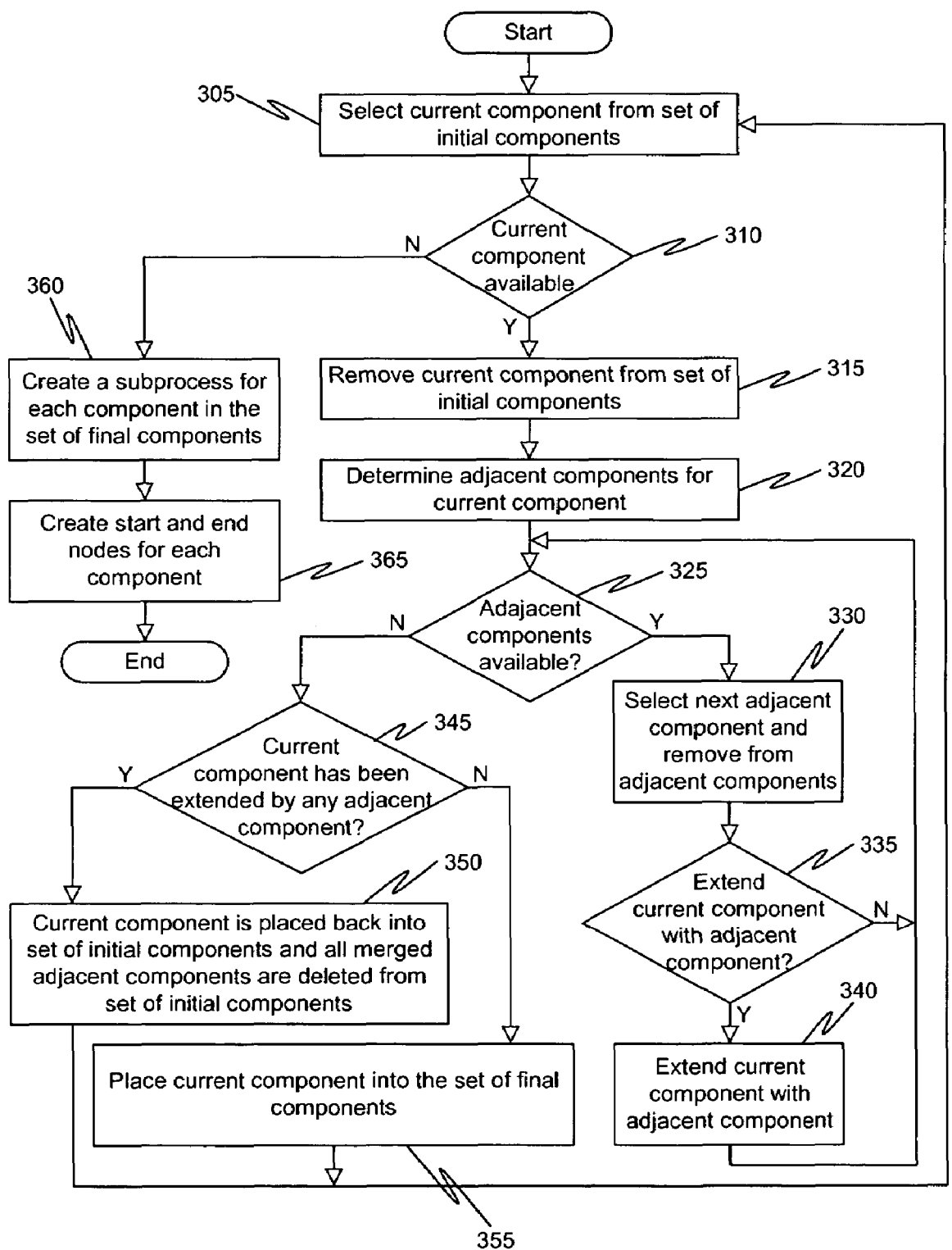
FIG. 3 illustrates a flow diagram of an algorithm for performing componentization of an initial Websphere Business (WB) model in accordance with an embodiment of the present invention.

Referring now to FIG. 3, a flow diagram of an algorithm for performing componentization on an initial Websphere Business (WB) model is shown in accordance with an embodiment of the present invention. Each task and control action can be represented in one component (named task component and control action component). Each task component can be given a business goal. For each control action component, it can be decided whether it should remain visible outside of the task components, in the main process at the top-most level of hierarchy or whether it can be merged with a task component. As a result, a set of initial components can be obtained. A second set of final components is initialized to be empty.

An arbitrary component is selected from the set of initial components at step 305 and becomes the current component. At step 310, it is determined if the previous selection of a current component has been successful. If this is the case, the current component is removed from the set of initial components at step 315. A list of adjacent components for the current component is determined at step 320. In an embodiment of the present invention, an adjacent component can be a component preceding or following the current component in the control flow of an initial WB model. If adjacent components are available at step 325, a next adjacent component is selected and removed from the set of adjacent components at step 330 for inspection. Upon inspection, there can be two cases. The first case is that the adjacent component is not a control action component. In this case, if the current component and the adjacent component have similar business goals, the two components can be merged into one component to obtain a new component, otherwise they may not be merged. In the second case, the adjacent component is a control action component. The control action component can be included into the current component to obtain a new component At step 335, if the current component can be extended with the adjacent component, the current component is merged with the adjacent component at step 340. The algorithm then continues at step 325. If the current component cannot be extended with the adjacent component at step 335, the algorithm continues at step 325 as well.

If there are no more adjacent components available, it is determined at step 345 whether the current component has been extended by any adjacent component. If the current component has been extended by at least one adjacent component, the current component is placed back into the set of initial components and all merged adjacent components are deleted from the set of initial components at step 350 and the algorithm continues at step 305 to select the next current component. If the current component has not been extended by any adjacent component, the current component is placed into a set of final components at step 355 and the algorithm continues at step 305 to select the next current component. This way all the current components that are almost independent of each other and have significantly different business goals are found and placed in the set of final components.

When all the components in the set of initial components have been iterated over at step 310, a sub-process is created for each component in the set of final components at step 360. It will be appreciated by those skilled in the art that for a component with a single control action, no process is created. At step 365, a start and an end node is created for each component in the set of final components. The start and the end node can be created by inspecting each component. The start nodes and the end nodes can be connected to the tasks or the control action nodes without predecessors or successor within the process to preserve the control flow before componentization.

Figure 4:
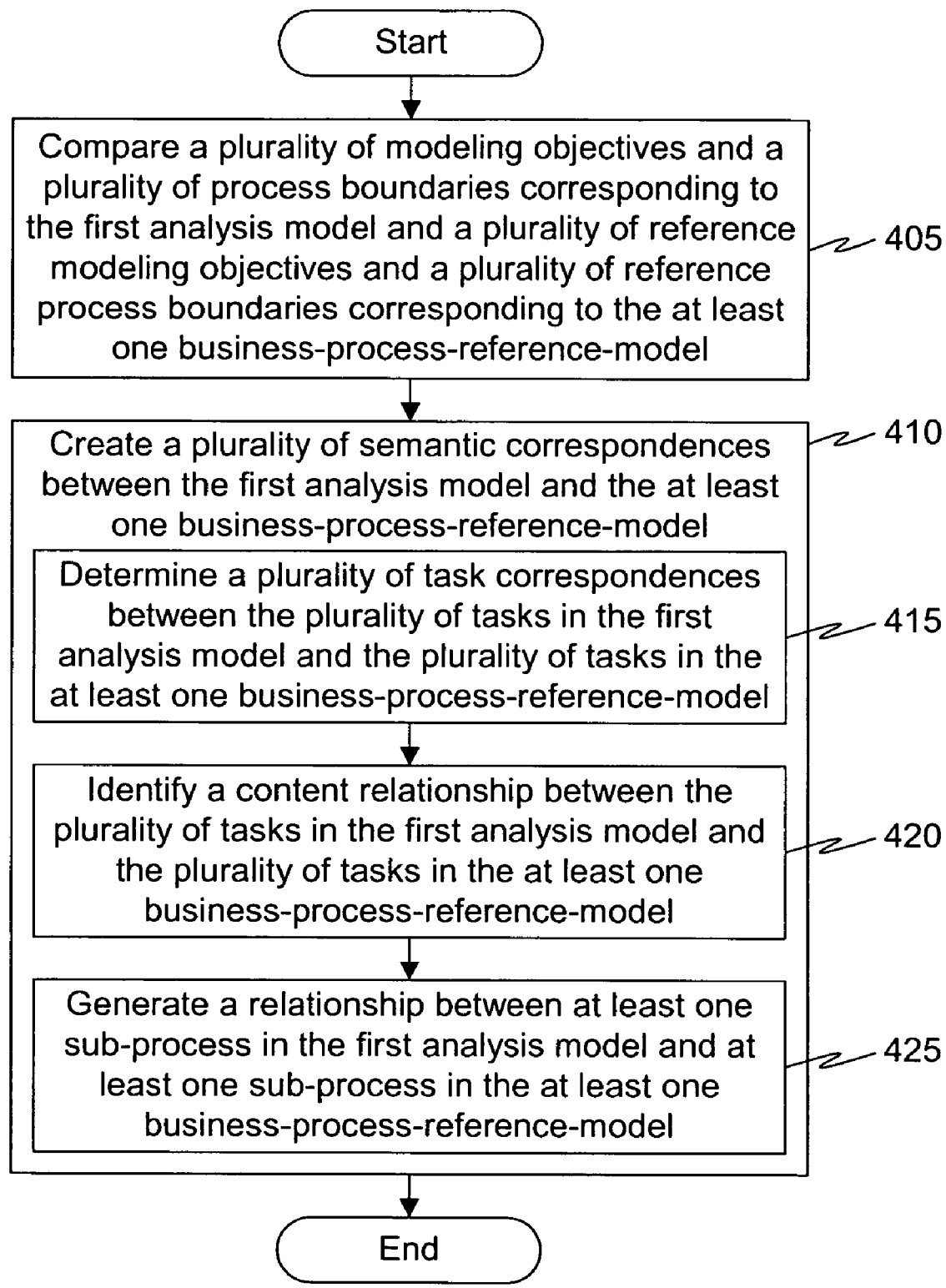
FIG. 4 illustrates a flow diagram of a method for analyzing a first analysis model in accordance with an embodiment of the present invention.

Referring now to FIG. 4, a flow diagram of a method for analyzing a first analysis model is shown in accordance with an embodiment of the present invention. The first analysis model can be an AS-IS analysis model. The first analysis model is analyzed in conjunction with at least one business-process-reference-model. A business-process-reference-model is a business process model that has been defined as a reference model. Generally, a reference model integrates well-known concepts of business process reengineering, benchmarking, and process measurement into a cross-functional framework. The method comprises comparing a plurality of modeling objectives and a plurality of process boundaries corresponding to the first analysis model and a plurality of reference modeling objectives and a plurality of reference process boundaries corresponding to the business-process-reference-model at step 405. Those skilled in the art shall realize that the modeling objectives corresponding to the business-process-reference-model can be available from reference documentation. Also, the modeling objectives corresponding to the first analysis model may need to be compatible with the modeling objectives of the business-process-reference-model. If the modeling objectives corresponding to the business-process-reference-model are very different from the modeling objectives corresponding to the first analysis model, the business-process-reference-models may not be able to serve as appropriate guidelines for the creation of a second analysis model. In this case a different business-process-reference-model can be chosen whose modeling objectives are compatible with that of the first analysis model. Similarly, based on the process boundaries corresponding to the first analysis model, the relevant business-process-reference-models are selected. Generally, a single most relevant business-process-reference-model with similar modeling objectives and process boundaries as the first analysis model is the outcome of step 405.

Upon selecting the appropriate business-process-reference-model, a plurality of semantic correspondences between the first analysis model and the business-process-reference-model is created at step 410. Creating semantic correspondences comprises determining a plurality of task correspondences between the plurality of tasks in the first analysis model and the plurality of tasks in the business-process-reference-model at step 415. Those skilled in the art will appreciate that although tasks might have different names in the first analysis model and the business-process-reference-model, they can still include the same behavior. Typically, the behavior of a task is partially captured by the name and partially captured by its informal textual description. The mapping between the tasks of the first analysis model and those in the business-process-reference-model is determined based on the informal textual description and additionally by detailed discussions of each task by business analysts.

In an embodiment of the present invention, some of the task correspondences between the plurality of tasks in the first analysis model and the plurality of tasks in the business-process-reference-model are one-to-one correspondence, one-to-zero correspondence, zero-to-one correspondence and one-to-many correspondence. One-to-one correspondence occurs when one task in the first analysis model is directly mapped to one task in the business-process-reference-model. One-to-zero correspondence occurs when a task in the first analysis model is mapped to none of the tasks in the business-process-reference-model. Zero-to-one correspondence occurs when the business-process-reference-model contains an additional task that has no correspondence in the first analysis model. One-to-many correspondence occurs when the first analysis model contains a task that has several corresponding tasks in the business-process-reference-model. Those skilled in the art will realize that the categorization of task correspondences described above is based on the idea to look from the first analysis model to the business-process-reference-model. Taking the business-process-reference-model as a starting point would lead to a different categorization, including a many-to-one correspondence.

Upon creating the task correspondences between the first analysis model and the business-process-reference-model at step 415, a content relationship is identified between the plurality of tasks in the first analysis model and the plurality of tasks in the at least one business-process-reference-model at step 420. In an embodiment of the present invention, the content relationships can be any one of an included type, a comprises type, an equal type and an overlapping type. The included type occurs when the content of the tasks of the first analysis model is included in the content of the tasks of the business-process-reference-model. The comprises type occurs when the content of the tasks of the first analysis model comprises more content than the content of the tasks of the business-process-reference-model. The equal type occurs when the content of the tasks of the first analysis model and the content of the tasks of the business-process-reference-model are equal. The overlapping type occurs when the content of the tasks of the first analysis model and the content of the tasks of the business-process-reference-model are overlapping but they are neither included nor comprised. An algorithm for creating semantic correspondences is explained in conjunction with FIG. 5.

On the basis of task correspondences between the first analysis model and the business-process-reference-model, a relationship of the sub-processes can be established. Therefore, a relationship between at least one sub-process in the first analysis model and at least one sub-process in the business-process-reference-model is generated at step 425. Those skilled in the art will realize that generation of this relationship between the at least one sub-process in the first analysis model and the at least one sub-process in the business-process-reference-model can be a fully automatic process that may exploit the manually established task correspondences. This relationship captures the similarities and differences between the first analysis model and the business-process-reference-model on the sub-process level. The relationship can later be used for a systematic adjustment of the business-process-reference-model to the first analysis model. Similar to the task correspondences, the relationship can be one-to-one, one-to-many, one-to-zero, and zero-to-one. Upon generating the relationship, a detailed view of how a sub-process in the first analysis model is related to one or more sub-processes in the business-process-reference-model can be obtained. Also, sub-processes in the business-process-reference-model that have sub-processes with corresponding functionality in the first analysis model are obtained. Those skilled in the art shall realize that establishing the relationship between the sub-processes can form a basis for adjusting process components and adding tasks.

In an embodiment of the present invention, the relationship between the sub-processes in the first analysis model and the sub-processes in the business-process-reference-model can also indicate whether the structure of the first analysis model and the business-process-reference-model are already aligned. In case a sub-process in the first analysis model is related to a sub-process in the business-process-reference-model and they have different depths, then there can be a structural mismatch. Structural mismatch means that the structure of the first analysis model is not aligned with the structure of the business-process-reference-model.

Figure 5:
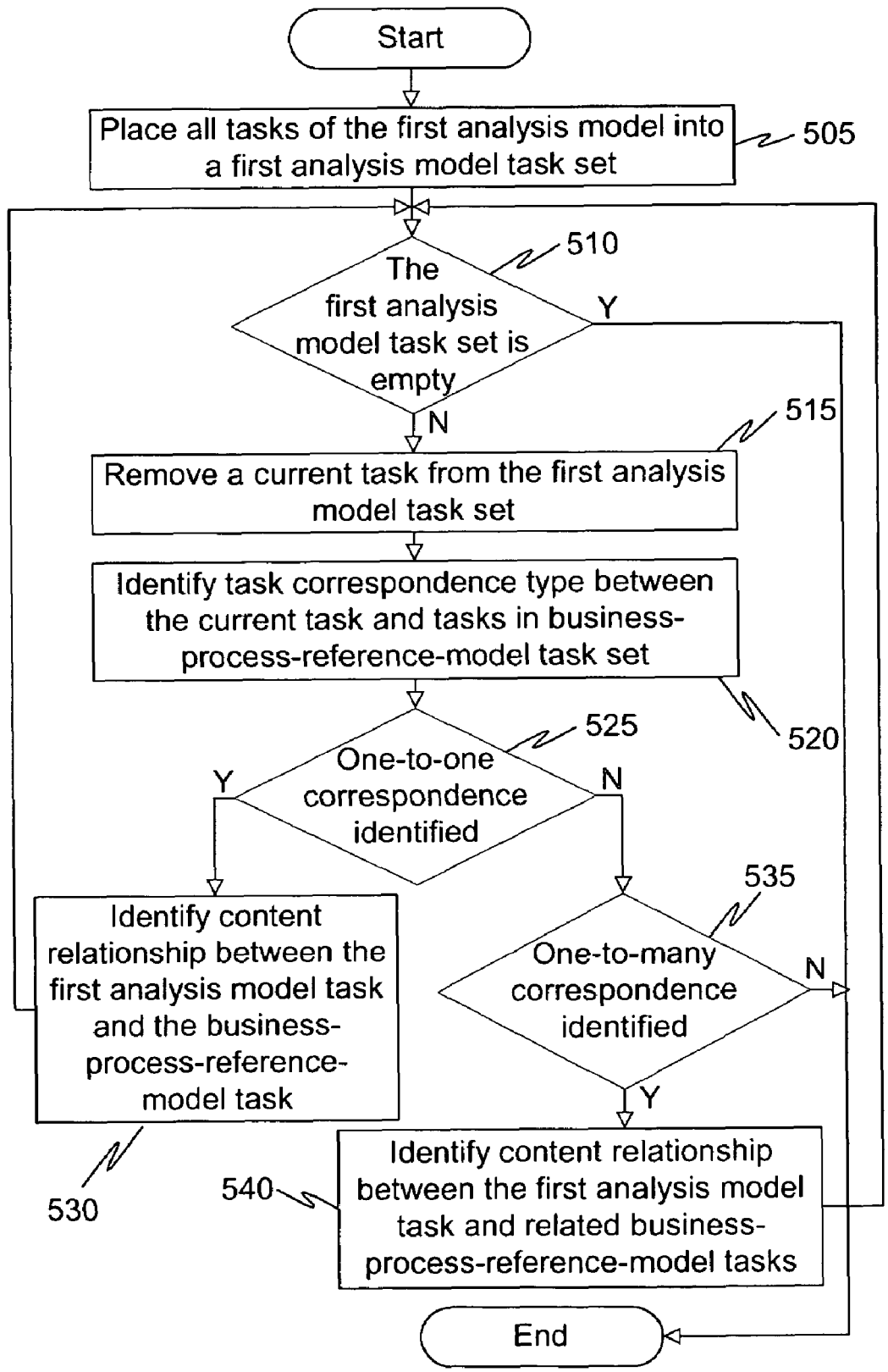
FIG. 5 illustrates a flow diagram of an algorithm for creating semantic correspondences between a first analysis model and a business-process-reference-model in accordance with an embodiment of the present invention.

Referring now to FIG. 5, a flow diagram of an algorithm for creating semantic correspondences between a first analysis model and a business-process-reference-model is shown in accordance with an embodiment of the present invention. Each task of a first analysis model is placed into a first analysis model task set at step 505. At step 510, it is checked whether there are any tasks in the first analysis model task set. If there are no tasks in the first analysis model task set, the algorithm terminates. If there is at least one task in the first analysis model task set, at step 515 a current task is removed from the first analysis model task set. The task correspondence type between the current task and tasks in a business-process-reference-model task set is identified at step 520. If a one-to-one correspondence is identified at 525, a content relationship between the first analysis model task and the business-process-reference-model task is identified at step 530. If a one-to-one correspondence is not identified at step 525 and a one-to-many correspondence is identified at step 535, a content relationship between the first analysis model task and related business-process-reference-model tasks is identified at step 540. The aforementioned steps are repeated for each task in the first analysis model task set.

Those skilled in the art will appreciate that all the task correspondences and the corresponding content relationships can be documented in a detailed task mappings table. More specifically, the task mappings table can comprise a first column listing each task in the first analysis model task set, a second column listing the task correspondence type for each task listed in the first column, a third column listing the content relationship for each task listed in the first column and a fourth column listing all the related business-process-reference-model tasks. The task mappings table can serve as a work list for the rest of the method of present invention.

It shall be appreciated by those with ordinary skill in the art that at the end of the task mapping process, a correspondence for each task of the first analysis model is either found or not found in the business-process-reference-model. Each of the task correspondence types can lead to specific actions in the subsequent steps of the present invention.

On the basis of the task correspondences created using the algorithm mentioned in FIG. 5, a sub-process relationship can be established between the first analysis model and the business-process-reference-model. An algorithm for generating a sub-process relationship between the first analysis model and the business-process-reference-model in accordance with an embodiment of the present invention is described in detail in FIG. 6. The sub-process relationships can capture the similarities and differences on the sub-process level and can later be used for a systematic adjustment of the business-process-reference-model to the first analysis model.

Figure 6:
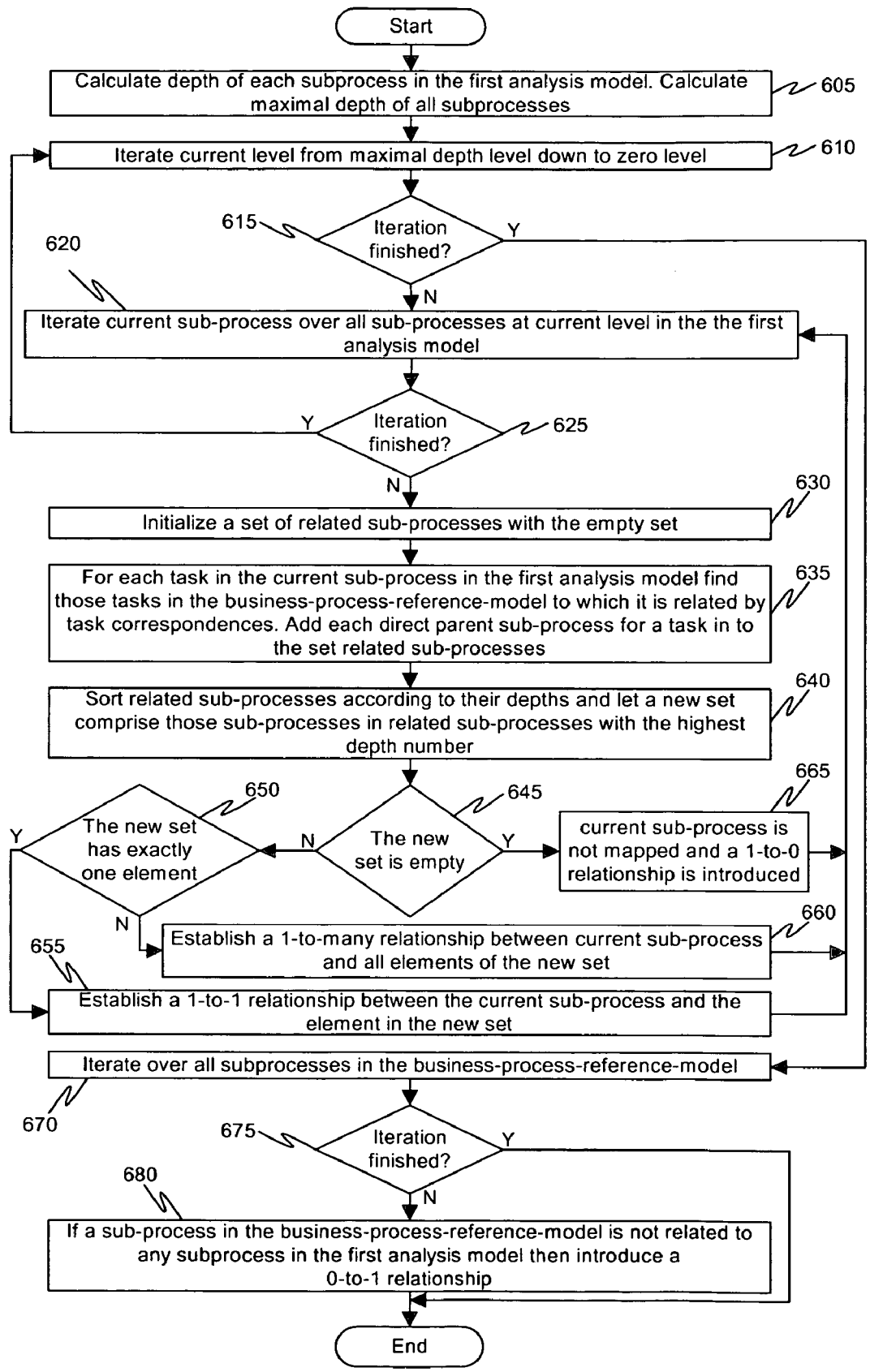
FIG. 6 illustrates a flow diagram of an algorithm for calculating a sub-process relationship between a first analysis model and a business-process-reference-model in accordance with an embodiment of the present invention.

Referring now to FIG. 6, a flow diagram of an algorithm for generating a sub-process relationship between a first analysis model and a business-process-reference-model is shown in accordance with an embodiment of the present invention. Assuming that the task correspondences have already been established, the depth of each sub-process in the first analysis model is calculated at step 605. In an embodiment of the present invention, it is assumed that a top-level process gets the value zero, all sub-processes that have the top-level process as direct parent get the value 1. As such, the depth can be defined as the number of parent sub-processes of a sub-process until the top-level process is reached. The maximal depth of all sub-process is also calculated at step 605.

The algorithm now iterates the current level from the maximal depth level down to zero level at step 610. In the first iteration, the current level is the maximal depth. In the iterations following the first iteration, the current level is decreased by one during each iteration. At step 615, it is determined if the iteration over all the levels from maximal depth level down to zero level is finished. If the iteration is finished, the algorithm continues at step 670. If the iteration is not finished, the algorithm iterates over each sub-process of the first analysis model at the current level at step 620. If the iteration is finished, the algorithm continues at step 610. Otherwise, a set comprising related sub-processes for the current sub-process is initialized with an empty set at step 630. At step 635, for each task in the current sub-process in the first analysis model, those tasks in the business-process-reference-model are found to which a task in the current sub-process is related by task correspondences as determined in FIG. 5. Each direct parent sub-process for a task in the business-process-reference-model is added to the set of related sub-processes at step 635. At step 640, the set of related sub-processes is sorted according to their depths. Also, a new set comprising sub-processes in the set of related sub-processes with a highest depth number is created.

The new set comprising sub-processes with a highest depth number is examined at step 645. If the new set is not empty, it is determined if the new set comprises exactly one element at step 650. If the new set has exactly one element in it, a one-to-one relationship is established between the current sub-process and the one element in the new set at step 655 and the algorithm continues at step 620 and a possible next sub-process acts as the current sub-process. Else, if the new set has more than one element in it, a one-to-many relationship is established between the current sub-process and all the elements of the new set at step 660 and the algorithm continues at step 620 and a possible next sub-process acts as the current sub-process. If the new set is empty, the current sub-process is not mapped and a one-to-zero relationship is introduced at step 665 and the algorithm continues at step 620 and a possible next sub-process acts as the current sub-process.

If the iteration over all the levels from the maximal depth level down to zero level is finished at step 615, all the sub-processes in the business-process-reference-model are iterated over at step 670. A current sub-process of the business-process-reference-model is determined. At step 675, it is determined if the iteration over all the sub-processes is finished. At step 680, a zero-to-one relationship is introduced for the current sub-process of the business-process-reference-model if the current sub-process of the business-process-reference-model is not related to any sub-process in the first analysis model.

Sub-process relationships, for instance one-to-one, one-to-many, one-to-zero and zero-to-one, can be generated using the algorithm described in FIG. 6. Those skilled in the art will realize that generation of this relationship between the at least one sub-process in the first analysis model and the at least one sub-process in the business-process-reference-model can be a fully automatic process that exploits the manually established task correspondences.

Figure 7:
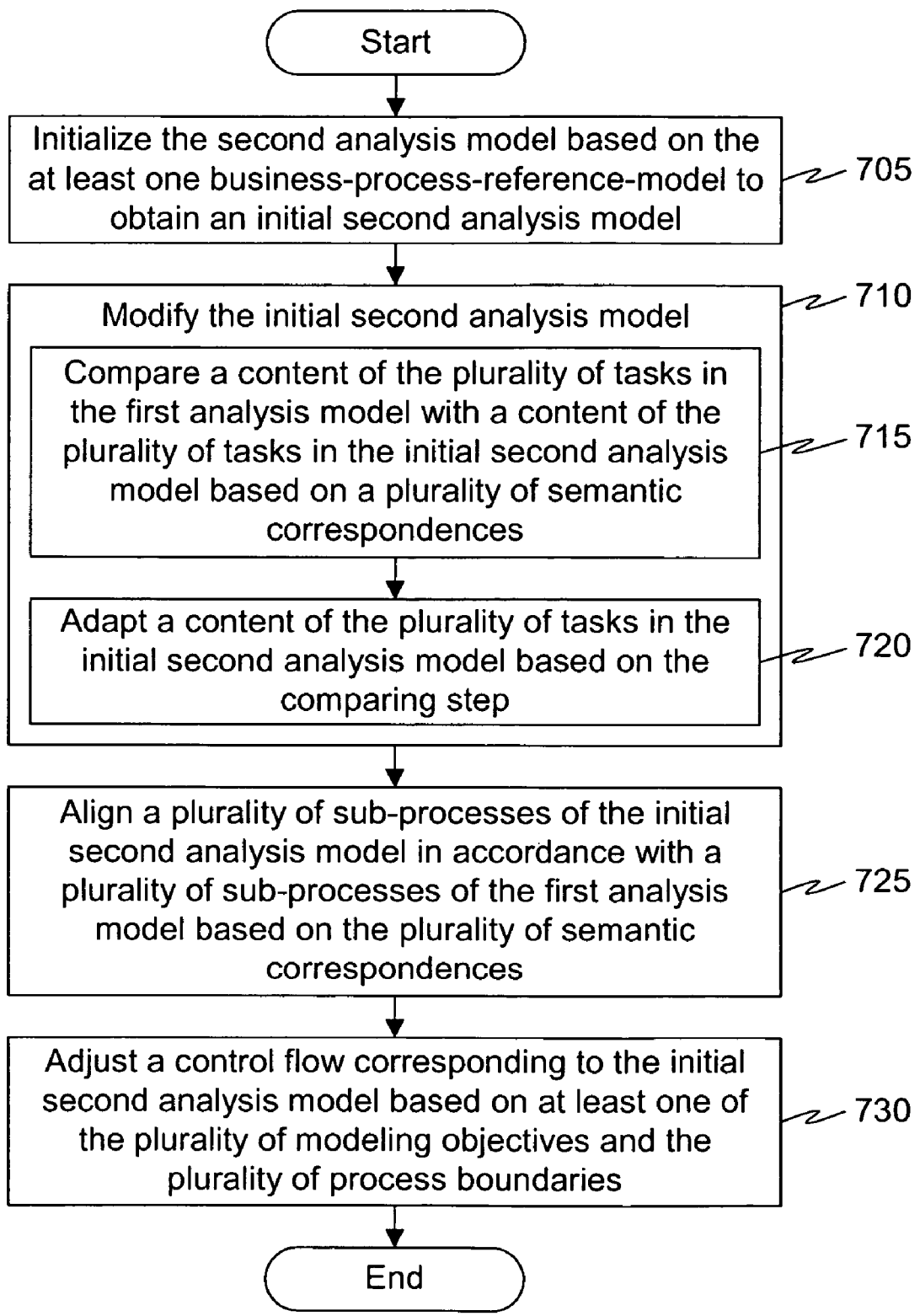
FIG. 7 illustrates a flow diagram of a method for deriving a second analysis model in accordance with an embodiment of the present invention.

Referring now to FIG. 7, a flow diagram of a method for deriving a second analysis model is shown in accordance with an embodiment of the present invention. The second analysis model is derived in conjunction with a business-process-reference-model. The method comprises initializing the second analysis model based on the at least one business-process-reference-model to obtain an initial second analysis model at step 705. The business-process-reference-model can be taken as the initial second analysis model and it can be gradually modified. The initial second analysis model is, then, modified at step 710. In the modifying step, step 710, the content of each task in the initial second analysis model is reviewed and adapted, if necessary. The modifying step comprises comparing a content of the plurality of tasks in the first analysis model with a content of the plurality of tasks in the initial second analysis model at step 715, based on a plurality of semantic correspondences determined in FIG. 5. The modifying step further comprises adapting a content of the plurality of tasks in the initial second analysis model at step 720.

In an exemplary embodiment of the present invention, in case of a one-to-one correspondence, for the case of equal type of content relationship, nothing is done. Whereas for an included type or comprised type, the functionality of the business-process-reference-model task can either be extended or reduced, respectively. In case of an overlapping type, the functionality which is missing in the business-process-reference-model task can be added to the initial second analysis model.

In case of a one-to-many correspondence, for the case of equal type of content relationship, nothing is done. Whereas for an included type, comprised type or overlapping type, the functionality of the business-process-reference-model task can either be extended or reduced in the initial second analysis model.

After the adaptation of the contents of the tasks, differences between the business-process-reference-model and the first analysis model remain concerning the occurrence of tasks, their organization into sub-processes, and the control flow between them. The difference between the first analysis model and the business-process-reference-model may need to be taken into consideration and resolved if there is a customer need for aligning the second analysis model to the first analysis model. Therefore, the method further comprises aligning a plurality of sub-processes of the initial second analysis model in accordance with a plurality of sub-processes of the first analysis model at step 725 based on the semantic correspondences that are computed in FIG. 6. The possible actions for aligning the second analysis model are adding a task in the initial second analysis model if that task exists in the first analysis model and a related task is absent from the initial second analysis model (which can initially be the business-process-reference-model) or deleting a task from the initial second analysis model if a related task is absent in the first analysis model. All actions taken can be documented in a table for later justification and traceability.

In general, the different kinds of changes that are made in step 725 can be distinguished. If tasks are added to the initial second analysis model, then it can be a kind of customization of the initial second analysis model. Whereas, if tasks are removed, then it can be concretization of the initial second analysis model for the customer. For example, if a business-process-reference-model takes into account different lines of business, but the customer only deals with one of them, several tasks in the initial second analysis model may be removed.

Those skilled in the art shall realize that the fewer the changes made to the business-process-reference-model, the closer is the resulting second analysis model to the best practice. The more the changes made, the closer is the resulting second analysis model to the first analysis model. The ideal amount of changes can be different for each customer situation and is found by strictly obeying modeling objectives and considering IT legacy constraints.

The method of FIG. 7 further comprises adjusting the control flow in the initial second analysis model based on at least one of the plurality of modeling objectives and the plurality of process boundaries at step 730. In this step, the model granularity, optional and mandatory tasks and sub-processes, the control-flow between sub-processes and tasks, and decision points in the initial second analysis model are assessed and adjustments are made that reflect the modeling objectives and process boundaries as well as IT legacy constraints.

In an embodiment of the present invention, the overall adjustment of control flow can be organized on a sub-process basis where the control flow of related sub-processes is compared and adapted accordingly. The resulting control flow can be validated by several interactive walkthroughs with the customer or by using validation or simulation capabilities provided by the modeling tool.

Once the second analysis model is complete, a comparison between the first analysis model and the second analysis model can be performed to evaluate if the second analysis model considers all constraints and meets the modeling objectives. Analysis and simulation capabilities for the comparison from a BPM tool, such as a WebSphere Business (WB) Modeler, can be explored here.

Figure 8:
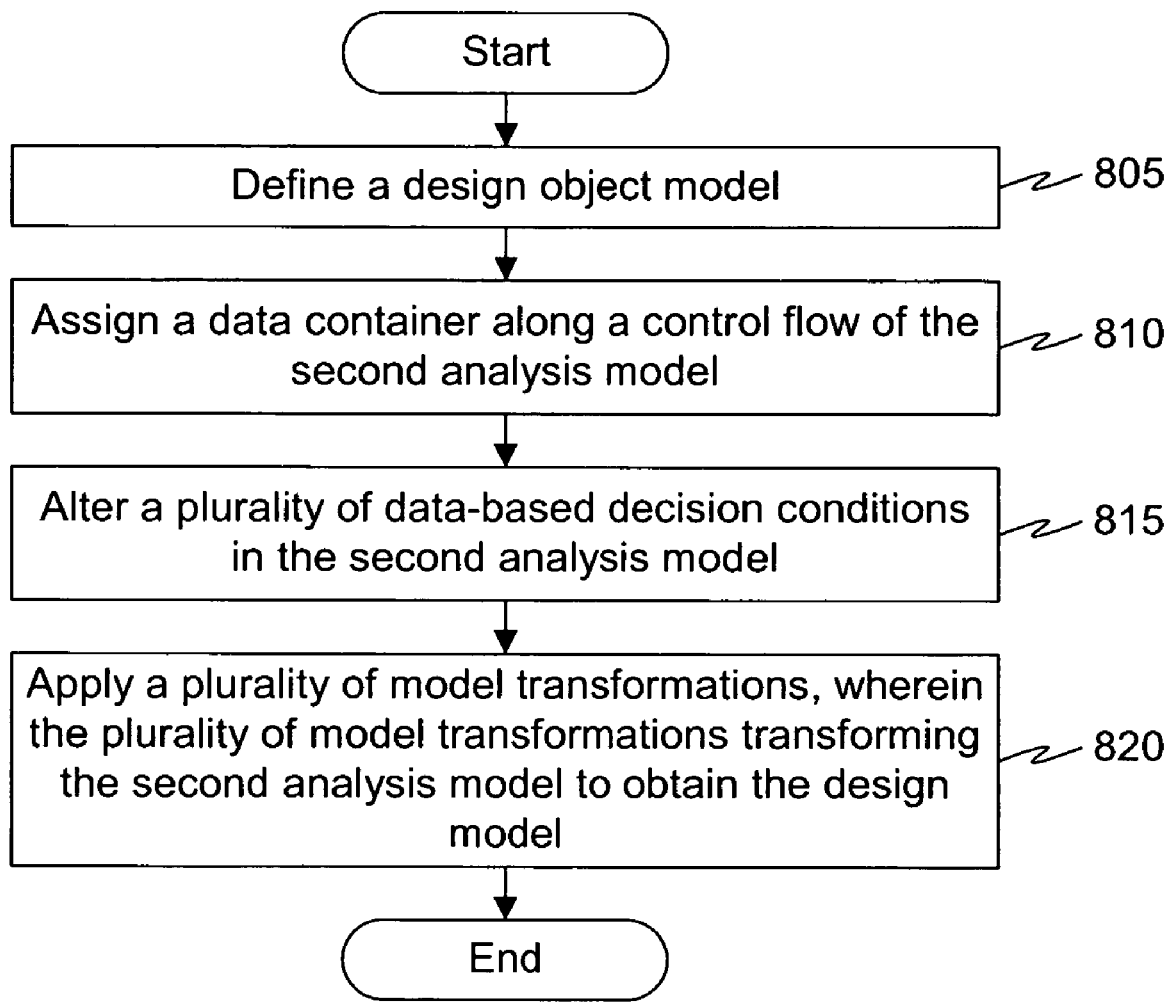
FIG. 8 illustrates a flow diagram of a method for refining a second analysis model to obtain a design model in accordance with an embodiment of the present invention.

Referring now to FIG. 8, a flow diagram of a method for refining a second analysis model to obtain a design model is shown in accordance with an embodiment of the present invention. As mentioned earlier, a design model describes how a business process is realized using hardware, software, and people. The method comprises defining a design object model at step 805. The second analysis model of the business process can contain definitions of the relevant business items that represent the information required by the various sub-processes. This is the information extracted in the method described in FIG. 2. The business items represent this information at the business (analysis) level without taking into account IT requirements.

A data container is determined that can carry this information across the process implementation. Since the target programming model in an embodiment of the present invention is a SOA based on Web services described in WSDL standard using explicit service choreographies described in the Business Process Execution Language (BPEL) standard, the information is transported in a data container represented as an Extensible Markup Language (XML) message. Those skilled in the art will realize an XML message is defined using an XML Schema Definition (XSD). XSD can be imported from the SOA existing at the customer's site or, alternately, it can be a newly defined schema by reusing or adopting a business-object-reference-model. Usually, such a business-object-reference-model is given as a UML class diagram.

The business-object-reference-model defines standard terminologies for business objects, which may differ from terms adopted in the customer's business. Adoption of terminology used in the business-object-reference-model by the customer or adjustment of the business-object-reference-model terminology and the model itself to the requirements of the customer may be necessary.

In an embodiment of the present invention, where the customer has no well-established terminology and object models in place, or if an integration of systems based on different terminologies or models needs to take place (for example after a merger or an acquisition), the adoption of the business-object-reference-model by the customer is recommended.

Once the terminology of objects in the business-object-reference-model has been finalized, the associations and other relations between objects are considered. The meaning of the relations and associations may need to be explained to the customer, so that the customer can verify that the business-object-reference-model correctly captures their understanding of their own data in the business. The relations can be adjusted in places where special customer needs require changes to the business-object-reference-model.

The finalized design object model is imported into a business process modeling tool, for example, WB Modeler, where it can become available as a design-level business item.

Upon defining the design object model at step 805, a data container for the design object model is assigned along a control flow of the second analysis model at step 810. The data container can be assigned along the control flow of the second analysis model using a plug-in into the WB Modeler that provides model transformations. The data container enriches the second analysis model with a data flow. Those skilled in the art shall realize that the data container represents the design-level business item.

Upon assigning a data container at step 810, a plurality of data-based decision conditions are altered in the second analysis model at step 815. Here, the decisions that occur in the second analysis model can be refined with conditions expressed in terms of specific data values provided by the assigned data container in step 810. For example, a condition that was captured informally in the second analysis model level can now be turned into a formal expression from which executable code can be generated.

The design model is obtained when a plurality of model transformations are applied to the second analysis model at step 820. The model transformations can be applied iteratively to further shape and refine the second-analysis model. An embodiment of the present invention comprises a fundamental model transformation that is required to meet the current BPEL standard. While business process models may, conventionally, contain unstructured cycles, these unstructured cycles can be replaced by structured loop nodes in BPEL. A model transformation plug-in can, now, be executed to perform this replacement in the second analysis model in WB Modeler. The result is a business process model that meets the restrictions of the BPEL export in the WB Modeler. The resulting design model can now be ready for code export to automatically produce the programming model.

Figure 9:
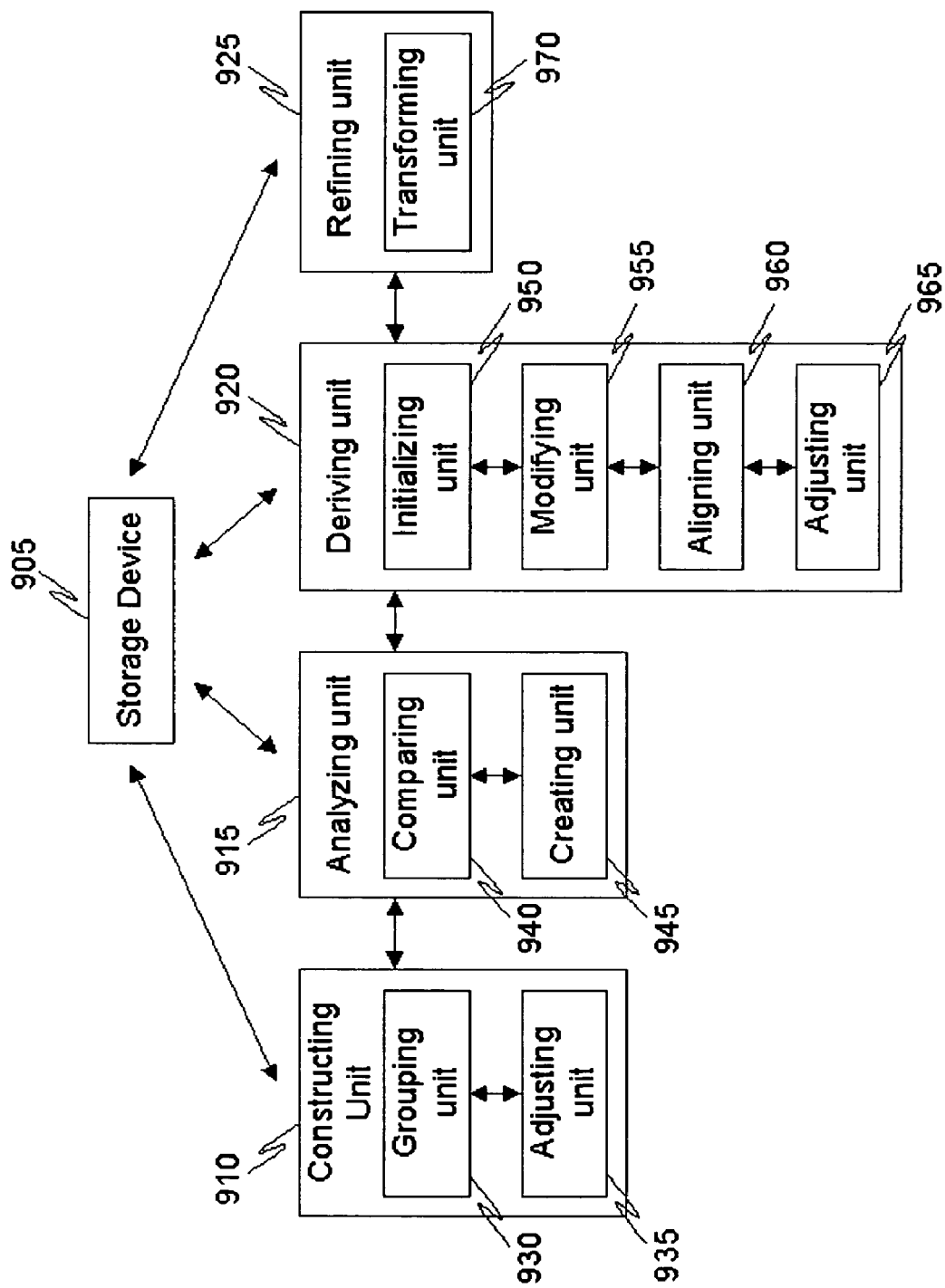
FIG. 9 illustrates a system for facilitating modeling for business transformation in accordance with an embodiment of the present invention.

Referring now to FIG. 9, a system for facilitating modeling for business transformation is shown in accordance with an embodiment of the present invention. The system comprises a storage device 905. Those with ordinary skill in the art shall realize that there can be more than one storage device in the system, each storage device adapted for different functionalities. Storage device 905 is adapted for receiving and storing at least one of a plurality of modeling objectives, a plurality of process boundaries, at least one business-process-reference-model, the first analysis model, the second analysis model and the design model. The system also comprises a constructing unit 910. Constructing unit 910 constructs a first analysis model based on at least one legacy-business-process-model stored in storage device 905. The constructed first analysis model is stored in storage device 905.

The system comprises an analyzing unit 915. Analyzing unit 915 analyses the first analysis model in conjunction with the at least one business-process-reference-model stored in storage device 905. A deriving unit 920 is also used for deriving a second analysis model. The second analysis model, derived in response to analyzing the first analysis model, is also stored in storage device 905 for future reference. A refining unit 925 is used to refine the second analysis model stored in storage device 905 to obtain a design model.

In an embodiment of the present invention, a graphical user interface (GUI) is coupled to the system. The GUI gives a service provider and a customer a graphical interface to interact with the system, thereby facilitating execution of constructing unit 910, analyzing unit 915 and deriving unit 920, and a refining unit 925.

Constructing unit 910 can comprise a grouping unit 930 and an adjusting unit 935. Grouping unit 930 can group a plurality of tasks of an initial WB model into a plurality of process components as described in the method of FIG. 2. The initial WB model is obtained from the first legacy-business-process-model. Grouping unit 930 can also be extended to perform a componentization on the initial WB model. Componentization essentially means giving a hierarchical structure to the initial WB model by identifying the plurality of process components of the initial WB model as explained in detail in FIG. 3. Adjusting unit 935 adjusts at least one of a plurality of control flow and the plurality of process components of the initial WB model as described in the method of FIG. 2.

Analyzing unit 915 can comprise a comparing unit 940. Comparing unit 940 can be configured to compare the plurality of modeling objectives and the plurality of process boundaries corresponding to the first analysis model and a plurality of reference modeling objectives and a plurality of reference process boundaries corresponding to the at least one business-process-reference-model. The method of comparing is described in detail in FIG. 4.

Analyzing unit 915 can also comprise a creating unit 945. Creating unit 945 is configured for creating a plurality of semantic correspondences between the first analysis model and a business-process-reference-model. The semantic correspondences comprise a plurality of task correspondences between tasks in the first analysis model and tasks in the at least one business-process-reference-model. The semantic correspondences also comprise content relationship between the tasks in the first analysis model and the tasks in the business-process-reference-model. Creating unit 945 is further designed for using the plurality of task correspondences to automatically compute a plurality of sub-process correspondences between sub-processes in the first analysis model and sub-processes in the business-process-reference-model.

Deriving unit 920 comprises an initializing unit 950. Initializing unit 950 initializes the second analysis model based on the business-process-reference-model to obtain an initial second analysis model. Deriving unit 920 also comprises a modifying unit 955. Modifying unit 955 is configured for modifying the initial second analysis model based on a content relationship between tasks in the first analysis model and tasks in the business-process-reference-model. Deriving unit 920 can also comprise an aligning unit 960. Aligning unit 960 is configured for aligning sub-processes of the initial second analysis model in accordance with sub-processes of the first analysis model based on the plurality of semantic correspondences created by creating unit 945.

In an embodiment of the present invention, deriving unit 920 further comprises an adjusting unit 965 for adjusting a control flow corresponding to the initial second analysis model This includes the automatic presentation of those tasks and sub-processes that have been changed by aligning unit 960 and that need the definition of a new control flow.

Refining unit 925 comprises a transforming unit 970. Transforming unit 970 can apply a plurality of model transformations to the second analysis model to transform the second analysis model to the design model. The method of applying the plurality of model transformations is explained in detail in FIG. 8.

The transformations from the second analysis model to the design model are repeatable to easily accommodate design changes. They also form the basis to establish synchronization links between the second analysis model and design model and the design model and the programming model. Those skilled in the art shall realize that the structural similarity between the design model and a programming model (BPEL) can make it easier to synchronize and maintain both models and propagate future design changes to the programming model.

The various embodiments of the present invention provide a method and system for facilitating business process modeling. Conventional business process modeling methods create an initial first analysis model of the process without making use of any other model of this process. The present invention, on the other hand, provides a method using which an investment made by a customer in their legacy-business-process-models and legacy-business-object-models is preserved, while leveraging the best-practices available in the business-process-reference-models and the business-object-reference-models to obtain the second analysis model (for example a TO-BE analysis model) that achieves the business transformation goals put forward by the customer.

Moreover, the present invention facilitates a speed-up of the modeling and implementation effort through a systematic approach consisting of well-defined steps with well-defined outcomes. This leads to a better documentation of the customizations that are applied to the business process model and better quality of solutions through reuse of business-process-reference-models and business-object-reference-models. Also, business goals translate more directly into IT requirements through systematic transformation of the second analysis model into the design model and business requirements and investments are better protected through use of legacy-business-process-models and legacy-business-object-models.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims.

What is claimed is:

1. A method for modeling business transformation, the method comprising steps of:
   1) constructing a first analysis model comprising an IBM WebSphere Business (WB) notation, based on at least one legacy-business-process-model, wherein the first analysis model is a business process model representing a partitioning of a first legacy-business-process-model comprising an event-driven process chains notation into a plurality of sub-processes and a plurality of tasks, the constructing step comprising:
      a) grouping a plurality of tasks of an initial WB model into a plurality of process components, wherein the initial WB model is obtained from the first legacy-business-process-model, wherein the plurality of tasks are logically interrelated, comprising performing a componentization on the initial WB model, the componentization comprising giving a hierarchical structure by identifying the plurality of process components of the initial WB model;

and
b) adjusting at least one of a plurality of control flow and the plurality of process components of the initial WB model;
2) analyzing the first analysis model in conjunction with at least one business-process-reference-model, comprising:
   a) comparing a plurality of modeling objectives and a plurality of process boundaries corresponding to the first analysis model and a plurality of reference modeling objectives and a plurality of reference process boundaries corresponding to the at least one business-process-reference-model; and
   b) creating a plurality of semantic correspondences between the first analysis model and the at least one business-process-reference-model in response to comparing, comprising:
      i) determining a plurality of task correspondences between the plurality of tasks in the first analysis model and the plurality of tasks in the at least one business-process-reference-model, the plurality of task correspondences being at least one of a one-to-one correspondence, one-to-zero correspondence, zero-to-one correspondence and one-to-many correspondence;
      ii) identifying a content relationship between the plurality of tasks in the first analysis model and the plurality of tasks in the at least one business-process-reference-model, the content relationship being at least one of an included type, a comprises type, an equal type and an overlapping type; and
      iii) generating a relationship between at least one sub-process in the first analysis model and at least one sub-process in the at least one business-process-reference-model;
3) deriving a second analysis model in response to analyzing the first analysis model in conjunction with the at least one business-process-reference-model, comprising:
   a) initializing the second analysis model based on the at least one business-process-reference-model to obtain an initial second analysis model;
   b) modifying the initial second analysis model, the modifying step comprising:
      i) comparing a content of the plurality of tasks in the first analysis model with a content of the plurality of tasks in the initial second analysis model based on a plurality of semantic correspondences; and
      ii) adapting a content of the plurality of tasks in the initial second analysis model based on the comparing step;
   c) aligning a plurality of sub-processes of the initial second analysis model in accordance with a plurality of sub-processes of the first analysis model based on the plurality of semantic correspondences;
   d) adjusting a control flow corresponding to the initial second analysis model based on at least one of the plurality of modeling objectives and the plurality of process boundaries; and
4) refining the second analysis model to obtain a design model, wherein the refining step comprises applying a plurality of model transformations applied in a form of a model transformation plug-in, wherein the plurality of model transformations transform the second analysis model to the design model; comprising
   a) defining a design object model;
   b) assigning a data container along a control flow of the second analysis model, the data container enriching the second analysis model with a data flow;
   c) altering a plurality of data-based decision conditions in the second analysis model; and
   d) applying a plurality of model transformations, wherein the plurality of model transformations transform the second analysis model to obtain the design model.

* * * * *